United States Patent
Gibeau

(10) Patent No.: US 9,296,309 B2
(45) Date of Patent: Mar. 29, 2016

(54) CUSTOMIZED BATTERY CHARGING

(75) Inventor: John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 13/611,643

(22) Filed: Sep. 12, 2012

(65) Prior Publication Data

US 2014/0070606 A1    Mar. 13, 2014

(51) Int. Cl.
*B60L 1/00*        (2006.01)
*B60L 11/18*       (2006.01)

(52) U.S. Cl.
CPC ............ *B60L 11/1862* (2013.01); *Y02T 10/705* (2013.01); *Y02T 10/7005* (2013.01); *Y02T 10/7044* (2013.01)

(58) Field of Classification Search
USPC ............... 307/9.1; 320/150, 109; 345/184
See application file for complete search history.

(56) References Cited

U.S. PATENT DOCUMENTS

| | | | | |
|---|---|---|---|---|
| 8,712,677 B2* | 4/2014 | Miura | ................. | G01C 21/00 180/65.26 |
| 2008/0262668 A1* | 10/2008 | Yamada | ................. | B60K 6/46 701/22 |
| 2009/0229900 A1 | 9/2009 | Hafner et al. | | |
| 2009/0248228 A1* | 10/2009 | Miller | ................. | B60K 6/485 701/22 |
| 2010/0106351 A1* | 4/2010 | Hanssen | ................. | B60K 6/48 701/22 |

FOREIGN PATENT DOCUMENTS

| JP | 2008189121 A | | 8/2008 |
|---|---|---|---|
| JP | 2009063555 A | * | 3/2009 |

* cited by examiner

*Primary Examiner* — Rexford Barnie
*Assistant Examiner* — Xuan Ly
(74) *Attorney, Agent, or Firm* — David B. Kelley; Brooks Kushman, P.C.

(57) ABSTRACT

A vehicle is provided with a motor that is connected to a storage device. The motor is configured to provide drive torque and the storage device is configured to receive power from an external supply for facilitating charging. The vehicle also includes a user interface and a controller. The user interface is configured to provide a charge level selection. The controller is configured to receive input that is indicative of a present charge value. The controller is further configured to disable charging when the present charge value corresponds to the charge level selection.

17 Claims, 6 Drawing Sheets

CUSTOMIZED BATTERY CHARGING

TECHNICAL FIELD

One or more embodiments relate to a vehicle system and method for customized battery charging.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

The electric vehicle monitors the status of the battery using a number of measurements, including battery state of charge (BSOC). BSOC may be represented as a percentage that represents the amount of energy in the battery from 0% (empty) to 100% (full). Batteries may be damaged if they are overcharged or overly discharged.

SUMMARY

In one embodiment, a vehicle is provided with a motor that is connected to a storage device. The motor is configured to provide drive torque and the storage device is configured to receive power from an external source for facilitating charging. The vehicle also includes a user interface and a controller. The user interface is configured to provide a charge level selection. The controller is configured to receive input that is indicative of a present charge value. The controller is further configured to disable charging when the present charge value corresponds to the charge level selection.

In another embodiment, a vehicle system is provided with a battery that is configured to receive power from an external source for charging thereof. The vehicle system also includes a controller that is configured to receive input that is indicative of a customer state of charge (CSOC) selection and a present CSOC value. The controller is further configured to disable charging when the present CSOC value corresponds to a charging limit that is based on the CSOC selection.

In yet another embodiment, a method is provided for controlling charging of a storage device of an electric vehicle. Charging of the storage device is enabled. Input is received that is indicative of a charge level selection and a present charge value. The charge level selection corresponds to a variable charge level between a charging limit and a discharge limit. Charging is disabled when the present charge value corresponds to the charge level selection.

The vehicle system provides advantages by allowing the driver to customize battery charging by selecting a charge level based on their future travel plans, which may be less than a standard maximum charging limit. The vehicle system is also configured to modify the selected charge level based on present and historic vehicle conditions. Such customized battery charging extends battery life by avoiding excess cycling of the battery, and charging to undesired charge levels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
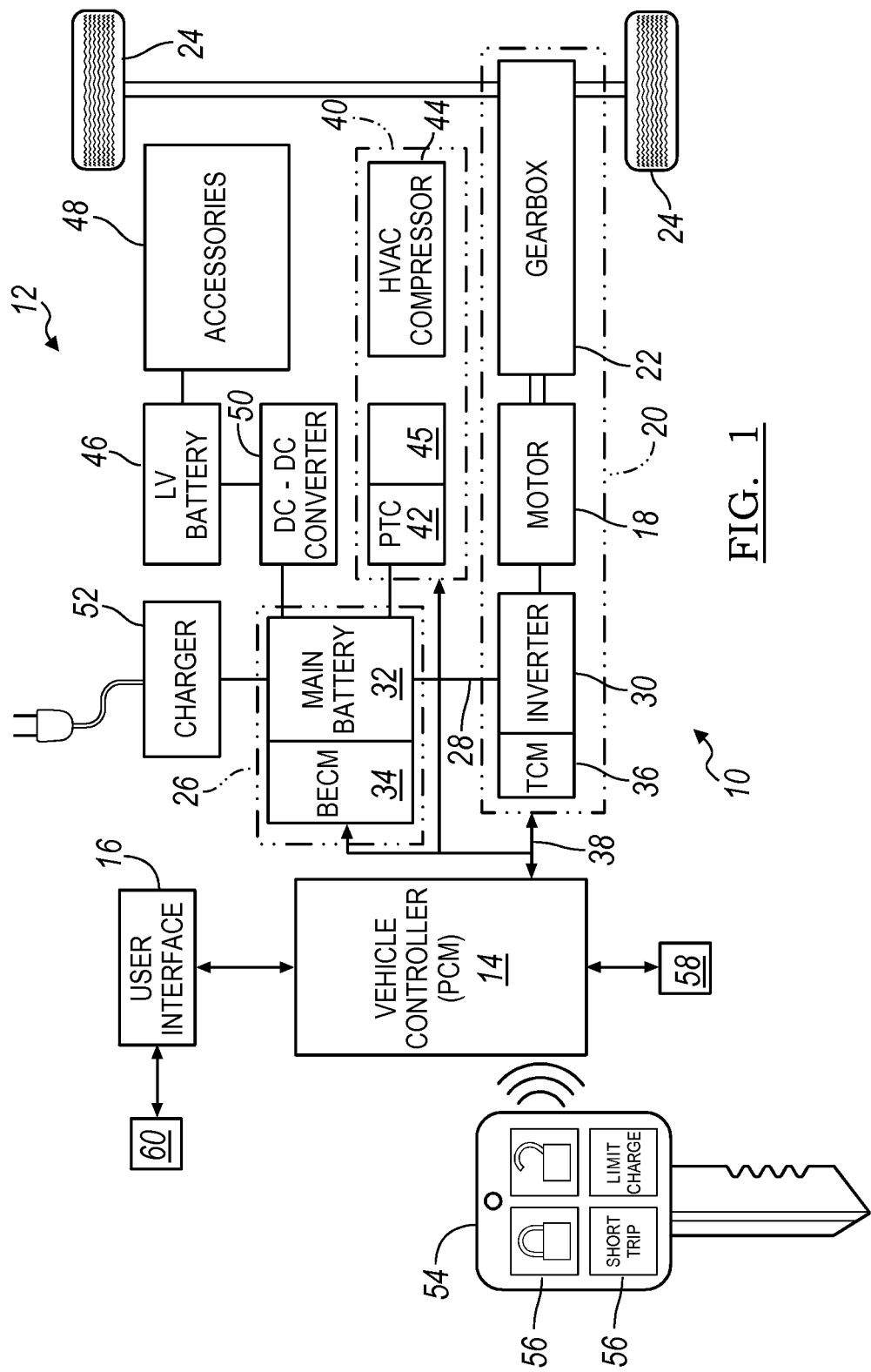
FIG. 1 is a schematic diagram of a vehicle system for customized battery charging according to one or more embodiments.

With reference to FIG. 1, a vehicle system for customized battery charging is illustrated in accordance with one or more embodiments and is generally referenced by numeral 10. The vehicle system 10 is depicted within a vehicle 12. The vehicle system 10 includes a vehicle controller 14 and a user interface 16 that are in communication with each other. The vehicle controller 14 receives input representing a selected battery charge level; and limits battery charging to an adjusted battery charge level that is based on the selected level and modified by vehicle control factors (e.g., battery, usage and navigation factors).

The illustrated embodiment depicts the vehicle 12 as a battery electric vehicle (BEV), which is an all-electric vehicle propelled by an electric motor 18 without assistance from an internal combustion engine (not shown). The motor 18 receives electrical power and provides drive torque for vehicle propulsion. The motor 18 also functions as a generator for converting mechanical power into electrical power through regenerative braking. The vehicle 12 has a transmission 20 that includes the motor 18 and a gearbox 22. The gearbox 22 adjusts the drive torque and speed of the motor 18 by a predetermined gear ratio. A pair of half-shafts extend in opposing directions from the gearbox 22 to a pair of driven wheels 24. In one or more embodiments, a differential (not shown) interconnects the gearbox 22 to the half-shafts.

Although illustrated and described in the context of a BEV 12, it is understood that embodiments of the present application may be implemented on other types of electric vehicles, such as those powered by an internal combustion engine in addition to one or more electric machines (e.g., hybrid electric vehicles (HEVs) and plug-in electric vehicles (PHEVs), etc.).

The vehicle 12 includes an energy storage system 26 for storing and controlling electrical energy. A high voltage bus 28 electrically connects the motor 18 to the energy storage system 26 through an inverter 30. The energy storage system 26 includes a main battery 32 and a battery energy control module (BECM) 34 according to one or more embodiments. The main battery 32 is a high voltage battery that is capable of outputting electrical power to operate the motor 18. The main battery 32 also receives electrical power from the motor 18, when the motor 18 is operating as a generator during regenerative braking. The inverter 30 converts the direct current (DC) power supplied by the main battery 32 to alternating current (AC) power for operating the motor 18. The inverter 30 also converts alternating current (AC) provided by the motor 18, when acting as a generator, to DC for charging the main battery 32. The main battery 32 is a battery pack made up of several battery modules (not shown), where each battery module contains a plurality of battery cells (not shown). The BECM 34 acts as a controller for the main battery 32. The BECM 34 also includes an electronic monitoring system that manages temperature and state of charge of each of the battery cells. Other embodiments of the vehicle 12 contemplate different types of energy storage devices, such as capacitors and fuel cells (not shown).

The transmission 20 includes a transmission control module (TCM) 36 for controlling the motor 18 and the inverter 30. The TCM 36 monitors, among other things, the position, speed, and power consumption of the motor 18 and provides output signals corresponding to this information to other vehicle systems. The TCM 36 and the inverter 30 convert the direct current (DC) voltage supply by the main battery 32 into alternating current (AC) signals that are used to control the motor 18.

The vehicle controller 14 communicates with other vehicle systems and controllers for coordinating their function. Although it is shown as a single controller, the vehicle controller 14 may include multiple controllers that may be used to control multiple vehicle systems according to an overall vehicle system control (VSC) logic, or software. For example, the vehicle controller 14 may be a powertrain control module (PCM) having a portion of the VSC software embedded therein. The vehicle controller 14 generally includes any number of microprocessors, ASICs, ICs, memory (e.g., FLASH, ROM, RAM, EPROM and/or EEPROM) and software code to co-act with one another to perform a series of operations. The vehicle controller 14 also includes predetermined data, or "look up tables" that are based on calculations and test data that is stored within the memory. The vehicle controller 14 communicates with other controllers (e.g., TCM 36, BECM 34) over a hardline vehicle connection 38 using a common bus protocol (e.g., CAN or LIN).

The user interface 16 communicates with the vehicle controller 14 for receiving information regarding the vehicle 12 and its surroundings, and conveys this information to the driver. The user interface 16 includes a number of interfaces, such as gauges, indicators, and displays. The user interface 16 may also include a controller (not shown) for communicating with the vehicle controller 14 and external devices, such as a computer or cellular phone. The vehicle controller 14 provides output to the user interface 16, such as a status of the motor 18 or battery 32, which is conveyed visually to the driver. The user interface 16 is also configured to receive information from the driver (e.g., a battery charge level selection) and provide this information to the vehicle controller 14.

The vehicle 12 includes a climate control system 40 for heating and cooling various vehicle components and a passenger compartment (not shown). The climate control system 40 includes a high voltage positive temperature coefficient (PTC) electric heater 42 and a high voltage electric HVAC compressor 44, according to one or more embodiments. The PTC heater 42 and HVAC compressor 44 are used to heat and cool fluid, respectively, that circulates to the transmission 20 and to the main battery 32. Both the PTC heater 42 and the HVAC compressor 44 may draw electrical energy directly from the main battery 32. The climate control system 40 includes a climate controller 45 for communicating with the vehicle controller 14 over the CAN bus 38. The on/off status of the climate control system 40 is communicated to the vehicle controller 14, and can be based on, for example, the status of an operator actuated switch, or the automatic control of the climate control system 40 based on related functions, such as window defrost. In other embodiments, the climate control system 40 is configured for heating and cooling air (e.g., existing vehicle cabin air) rather than fluid, and circulating the air through the battery 32 and/or transmission 20.

The vehicle 12 includes a secondary low voltage (LV) battery 46, such as a 12-volt battery, according to one embodiment. The secondary battery 46 may be used to power various vehicle accessories 48 such as headlights, and electric actuators (not shown).

A DC-to-DC converter 50 is electrically connected between the main battery 32 and the LV battery 46. The DC-to-DC converter 50 adjusts, or "steps down" the voltage level to allow the main battery 32 to charge the LV battery 46. A low voltage bus electrically connects the DC-to-DC converter 50 to the LV battery 46 and the accessories 48.

The vehicle 12 includes an AC charger 52 for charging the main battery 32. An electrical connector connects the AC charger 52 to an external power supply (not shown) for receiving AC power. Other embodiments of the AC charger 52 contemplate an electrical connector that couples to an external charge port for facilitating inductive charging (not shown). The AC charger 52 includes power electronics used to invert, or "rectify" the AC power received from the external power supply to DC power for charging the main battery 32. The AC charger 52 is configured to accommodate one or more conventional voltage sources from the external power supply (e.g., 110 volt, 220 volt, etc.). The external power supply may include a device that harnesses renewable energy, such as a photovoltaic (PV) solar panel, or a wind turbine (not shown).

The vehicle 12 includes a key 54 for unlocking the vehicle. The key 54 includes a housing with an internal transmitter and a plurality of externally accessible buttons 56 (e.g., a key fob). The key 54 is configured to transmit a wireless signal in response to a button 56 being depressed. Each button 56 corresponds to a different vehicle function, such as locking or unlocking door locks. The illustrated embodiment also depicts a "short trip" button 56 and a "limit charge" button 56, which are used for customized battery charging.

Also shown in FIG. 1 is a simplified schematic representation of a driver controls system 58. The driver controls system 58 includes acceleration, braking, steering and gear selection (shifting) systems (all generally referenced by numeral 58). The acceleration system includes an accelerator pedal having one or more sensors, which provides pedal position information that corresponds to a driver request for drive torque. The braking system includes a brake pedal, a booster, a master cylinder, as well as mechanical connections to the vehicle wheels, such as the primary driven wheels 24, to effect friction braking. The braking system also includes a brake controller (not shown) that communicates with the vehicle controller 14 to coordinate regenerative braking and friction braking.

The vehicle 12 includes a navigation system 60 that communicates with the user interface 16 for receiving destination information from a driver. The navigation system 60 also communicates with a plurality of systems/networks that are external to the vehicle. For example the navigation system 60 may include transceivers for communicating with satellites (e.g. GPS), and computers (via cellular networks, hardwire connections or radio frequency (RF) waves) (not shown). Such networks are described in detail in U.S. application Ser. No. 12/744,092 to Pleet et al., which is hereby incorporated by reference. The navigation system 60 determines a distance between a present location of the vehicle 12 and the destination selected by the driver, and provides this distance and/or location information associated with the vehicle 12, its target destinations, or other relevant GPS waypoints to the user interface 16. In another embodiment, the navigation system 60 provides the distance and location information directly to the vehicle controller 14, which in turn provides this information to the user interface 16.

Figure 2:
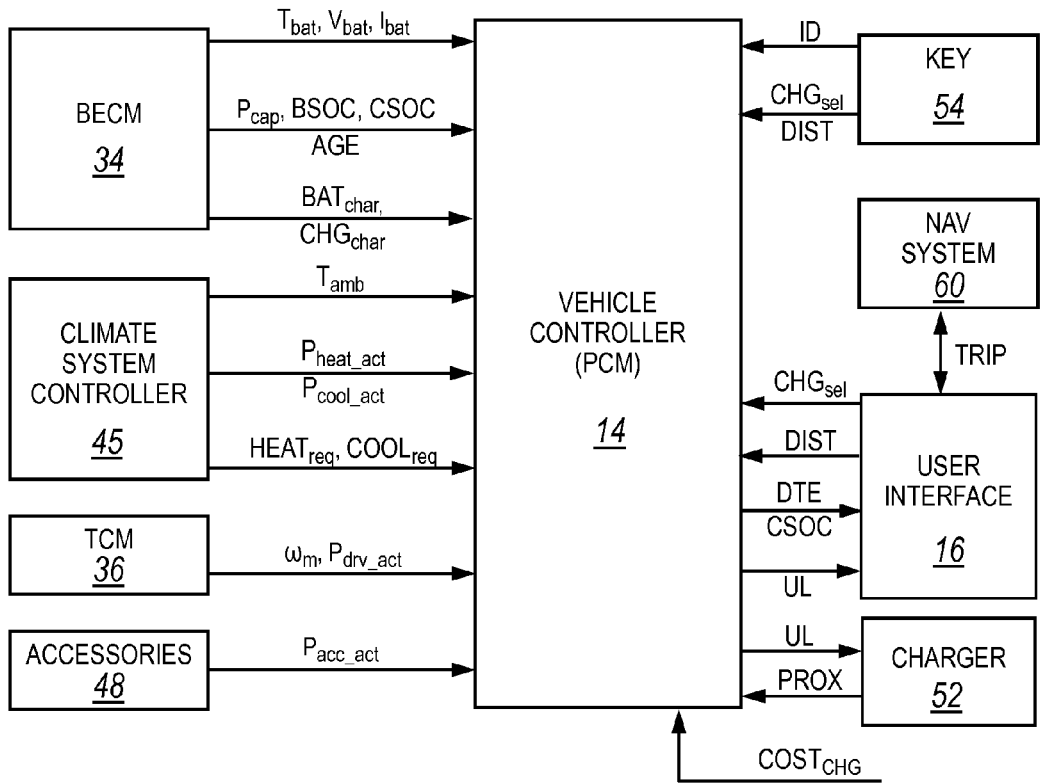
FIG. 2 is an enlarged schematic view of a portion of the vehicle system of FIG. 1, illustrating internal vehicle communication.

With reference to FIGS. 1 and 2, the vehicle controller 14 receives input that corresponds to battery control factors, usage control factors, navigation factors and a battery charge level selection. The vehicle controller 14 provides output that corresponds to a charging limit that is based on the input. Each input may be a signal transmitted directly between the vehicle controller 14 and the corresponding vehicle system, or indirectly as data over the CAN bus 38.

The BECM 34 provides input to the vehicle controller 14 that corresponds to battery control factors including: measured battery values, calculated battery values and battery characteristic information.

The BECM 34 monitors present battery conditions, and provides input ($T_{bat}$, $V_{bat}$, $I_{bat}$) to the vehicle controller 14 that represents battery temperature, battery voltage, and battery current measurement values, respectively. The vehicle 12 includes sensors (not shown) for measuring battery conditions. The BECM 34 communicates with these sensors directly, or indirectly over the vehicle bus for receiving the measurement values.

The BECM 34 also compares present battery conditions to predetermined and historic data to calculate present battery conditions. The BECM 34 provides input ($P_{cap}$, BSOC, CSOC, AGE) to the vehicle controller 14 that represents battery power capability, battery state of charge, customer state of charge and battery aging, respectively. The $P_{cap}$ input represents the total amount of power that the battery 32 is capable of providing (discharging) to other vehicle components (e.g., the motor 18 and the climate control system 40). $P_{cap}$ also represents the total amount of power that the battery 32 is capable of receiving during charging. The BSOC input represents the battery state of charge, which is the amount of electric energy of the main battery 32 as a percentage from 0% (empty) to 100% (full). The CSOC input represents the customer state of charge, which is the amount of "available" electric energy of the main battery 32 as a percentage. The relationship between BSOC and CSOC is described in detail below with respect to FIG. 3. The AGE input represents the battery life ("aging") or degradation of the battery based on the change in capacity over time, faults, and any predetermined limits.

The BECM 34 includes predetermined or calibrated data, and provides input ($BAT_{char}$, $CHG_{char}$) to the vehicle controller 14 that represents battery characteristics and charger characteristics, respectively. The $BAT_{char}$ input represents inherent battery characteristics such as chemistry, (e.g., lithium-ion, or nickel-cadmium) and the number of cells. The $CHG_{char}$ input represents inherent charger characteristics, such as charging rate, and current limits.

The vehicle controller 14 also receives input that corresponds to usage control factors that are related to power consumption of the climate control system 40, motor 18 and accessories 48.

The climate controller 45 provides input ($P_{heat\_act}$, $P_{cool\_act}$) that represents the actual electrical power consumption by the climate control system 40 to heat and cool the vehicle 12. The $P_{heat\_act}$ input represents the actual electrical power provided to the ptc heater 42 to heat the vehicle. The $P_{cool\_act}$ input represents the actual electrical power provided to the HVAC compressor 44 to cool the vehicle 12. In other embodiments, the vehicle controller 14 may receive voltage and current measurements that correspond to electrical power consumption. The climate controller 45 also provides input ($T_{amb}$) that represents ambient temperature conditions, according to one or more embodiments.

The climate controller 45 also provides input ($HEAT_{req}$, $COOL_{req}$) to the vehicle controller 14 that represents driver thermal requests. The $HEAT_{req}$ input represents a driver request for heating, and the $COOL_{req}$ input represents a driver request for cooling. The $HEAT_{req}$ and the $COOL_{req}$ are indicative of future electrical power consumption of the climate control system 40.

The vehicle controller 14 receives input ($\omega_m$, $P_{drv\_act}$) that is indicative of motor 18 conditions. The $\omega_m$ input represents the output speed of the motor 18, and the $P_{drv\_act}$ input represents the actual electrical power provided to the motor 18 to generate drive torque for propelling the vehicle 12.

The vehicle controller receives input ($P_{acc\_act}$) that represents the actual power consumption of the accessories 48. The $P_{acc\_act}$ input represents the actual power that is provided to the LV battery 46, which is in turn provided to the accessories 48.

The vehicle controller 14 saves this power consumption data (e.g., $P_{heat\_act}$, $P_{cool\_act}$, $P_{drv\_act}$ and $P_{acc\_act}$) in its memory along with other data corresponding to certain vehicle conditions and the identity of the driver, when such power is consumed. By saving such data, the vehicle controller 14 develops historic data that it can later reference to estimate future power consumption.

The vehicle controller 14 receives input (DIST) that corresponds to navigation factors. The DIST input corresponds to the distance between the present location of the vehicle 12, and a destination location. In one embodiment, the DIST input corresponds to a calculated distance. The user interface 16 communicates with the navigation system 60 to determine a distance based on GPS data. For example, in one embodiment the driver selects a destination (TRIP) using the user interface 16. The navigation system 60 then provides travel options (TRIP) to the driver which may include additional information (e.g., traffic, construction, charging station locations, etc.). Once a route is selected, the user interface 16 determines a distance (DIST). In another embodiment the DIST input corresponds to a predetermined distance. The key 54 transmits an output signal (DIST) that corresponds to a predetermined short distance "short trip" (e.g., 20 miles).

The vehicle controller 14 receives input ($CHG_{SEL}$) that represents the selected battery charging level. The $CHG_{SEL}$ input corresponds to an upper charging limit (UL) of the CSOC. The vehicle controller 14 is configured to disable charging when the CSOC value corresponds to the selected UL value. In one embodiment, the UL input corresponds to a variable value (e.g., between 20% and 100% CSOC) that is selected by the driver using the user interface 16. In another embodiment, the UL input corresponds to a predetermined charge level; where the key 54 transmits an output signal (UL) that corresponds to a predetermined limited charge level "limit charge" (e.g., 60% CSOC).

The vehicle controller 14 receives input (ID) that represents the identity of the present driver. The ID signal may be transmitted wirelessly, e.g., as a radio frequency (RF) signal. A user may possess multiple keys 54 for their vehicle, where each key transmits a distinct ID signal. Distinct ID signals may be used to configure different vehicle use. For example, a primary user may limit certain vehicle accessories that are accessible to a secondary user.

The vehicle controller 14 also receives input ($COST_{CHG}$) that represents the present cost associated with charging the battery 32. For example, some providers of electrical energy reduce the cost of energy that is provided at off-peak hours of the day. In one or more embodiments, the vehicle controller 14 communicates with an external source, such as a smart meter of the external power supply (not shown) or a computer via a cellular network to determine when the cost of the electrical energy reduces.

The vehicle controller 14 receives input (PROX) that represents the location of the vehicle 12 relative to the external power supply. For example, in one or more embodiments, the PROX input indicates whether or not the charger 52 is electrically connected to the external power supply.

The vehicle controller 14 evaluates the input and provides output (CSOC, DTE, UL) to the user interface 16 that represents the customer state of charge, an estimated vehicle travel range, or "distance to empty" (DTE) and the charging limit (UL), respectively. The vehicle controller 14 estimates DTE based on the numerous input signals. A method for estimating DTE is described in detail in U.S. provisional application No. 61/578,839 to Donald et al., and entitled Vehicle System for Estimating Travel Range, which is incorporated by reference in its entirety herein. The UL output is based on the charge level selection. In one embodiment, UL is equal to $CHG_{SEL}$. In other embodiments, the vehicle controller 14 modifies UL based on the other input. The vehicle controller 14 provides the UL output to the user interface 16, which in turn conveys the corresponding value to the driver. The vehicle controller 14 also provides the UL output to the charger 52 and/or the BECM 34 for disabling charging.

Figure 3:
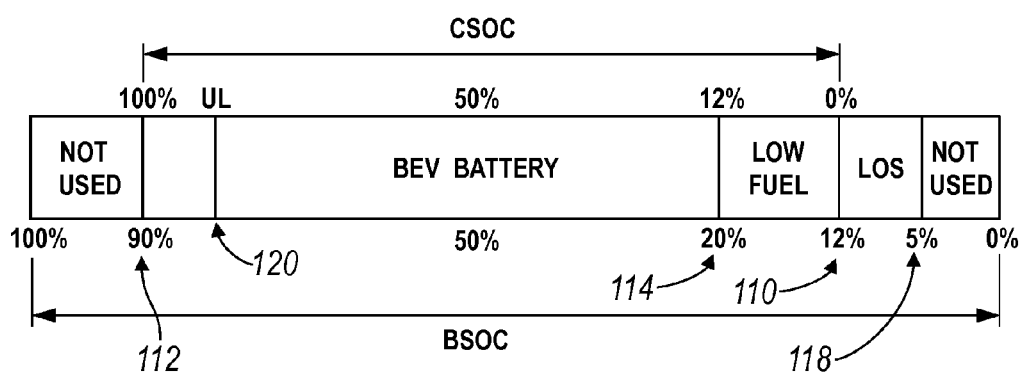
FIG. 3 is a diagram illustrating battery state of charge (BSOC) limits and customer state of charge (CSOC) limits of the vehicle system of FIG. 1.

FIG. 3 is a diagram illustrating the relationship between battery state of charge (BSOC) and customer state of charge (CSOC). BSOC represents the electric energy of the main battery 32 as a percentage from 0% (empty) to 100% (full). Generally, batteries may be damaged if they are overcharged or overly discharged. Therefore, the main battery 32 is maintained within a reduced operating range during normal operating conditions. In one or more embodiments the reduced operating range is between 12% BSOC and 90% BSOC. The 12% BSOC value corresponds to a discharge limit and is referenced by numeral 110. In other embodiments, the discharge limit is between 7% and 15% BSOC. The 90% BSOC value corresponds to a standard charging limit and is referenced by numeral 112. The reduced operating range includes a low charge limit and is referenced by numeral 114. The low charge limit is between 25% and 15% BSOC, according to one or more embodiments. The low charge limit is 20% BSOC in the illustrated embodiment.

The battery energy level information is conveyed to the driver visually by the user interface 16, according to one or more embodiments. The driver uses this energy level information much like a fuel gage on a conventional vehicle. However, the BSOC values are not displayed, because the reduced operation range may confuse a driver. For example, a driver might think they can drive the vehicle 12 until the battery is fully discharged (e.g., 0% BSOC). However, the battery 32 may be damaged if overly discharged. Therefore, the vehicle system 10 calculates a customer state of charge (CSOC) which corresponds to the operating range of the BSOC. According to the illustrated embodiment, a CSOC value of 0% corresponds to the discharge limit 110 (12% BSOC), a CSOC value of 100% corresponds to the standard charging limit 112 (90% BSOC), and a CSOC value of 12% corresponds to the low charge limit 114 (20% BSOC). The CSOC values, are the state of charge values that are conveyed to the driver, to prevent the driver from overcharging or overly discharging the battery 32.

One of the key customer concerns for owners of battery electric vehicles (BEV) and plug-in hybrid vehicles (PHEV) is the life of the battery itself. The battery is an expensive component and actions that can be taken to prolong the life of the battery are beneficial. A major "stress factor" contributing to the aging of the battery is how "full" it is, or its state of charge. Generally, the longer the battery is at a high state of charge, the more accelerated the aging process will be. This can be further exacerbated when the vehicle is in particularly warm environments. Additionally, for some battery chemistries, the relationship between state of charge and aging is non-linear, with higher SOCs causing a disproportionate amount of aging. However, to ensure maximum usable range to the customer when they get into the vehicle, existing charging systems charge the battery to its maximum state of charge (e.g., the standard charging limit 112), thereby potentially causing unnecessary aging should the user's next trip not require the maximum range of the vehicle.

The vehicle system 10 provides advantages by allowing the user to indicate to the vehicle system 10 that the next trip between charges will not require maximum range by selecting a charging level that corresponds to a charging limit (UL) denoted by numeral 120, that is less than the standard charging limit 112.

Figure 4:
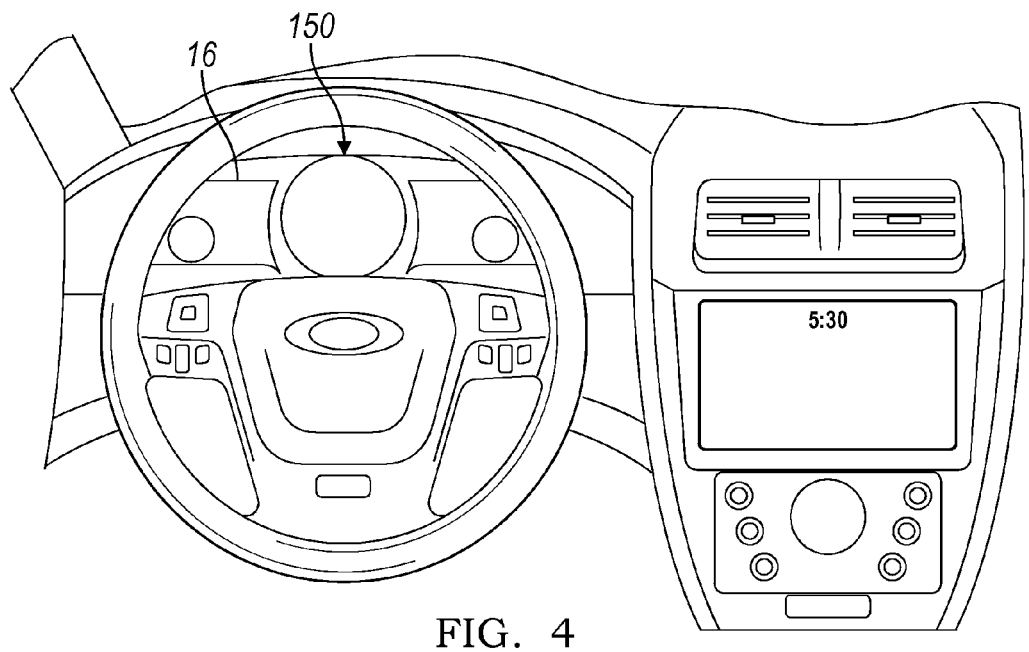
FIG. 4 is a front perspective view of a user interface of the vehicle system of FIG. 1.

With reference to FIG. 4, the user interface 16 is located within an instrument cluster 150 according to one or more embodiments. In other embodiments, the user interface may be located in a central portion of a dashboard ("centerstack"). The user interface 16 may be a liquid crystal display (LCD), a plasma display, an organic light emitting display (OLED), or any other suitable display. The user interface 16 may include a touch screen or one or more buttons (not shown), including hard keys or soft keys, located adjacent the user interface 16 for effectuating driver input. In other embodiments, the user interface may be a key, such as the key 54 shown in FIG. 1.

Figure 5:
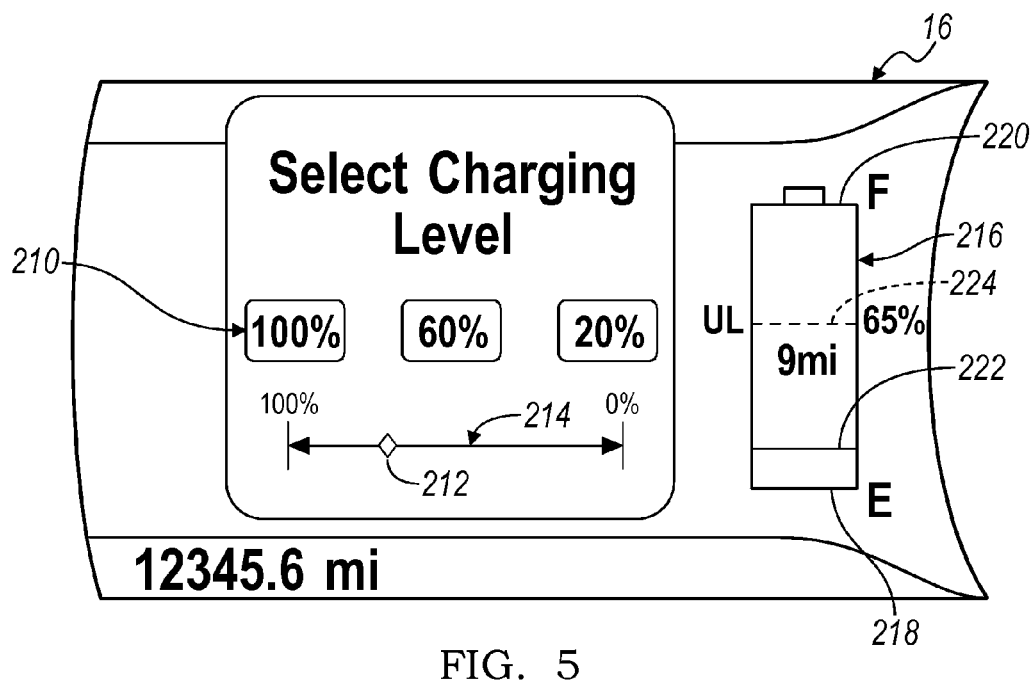
FIG. 5 is an enlarged view of the user interface of FIG. 4, illustrating selection of a battery charge level.
Figure 6:
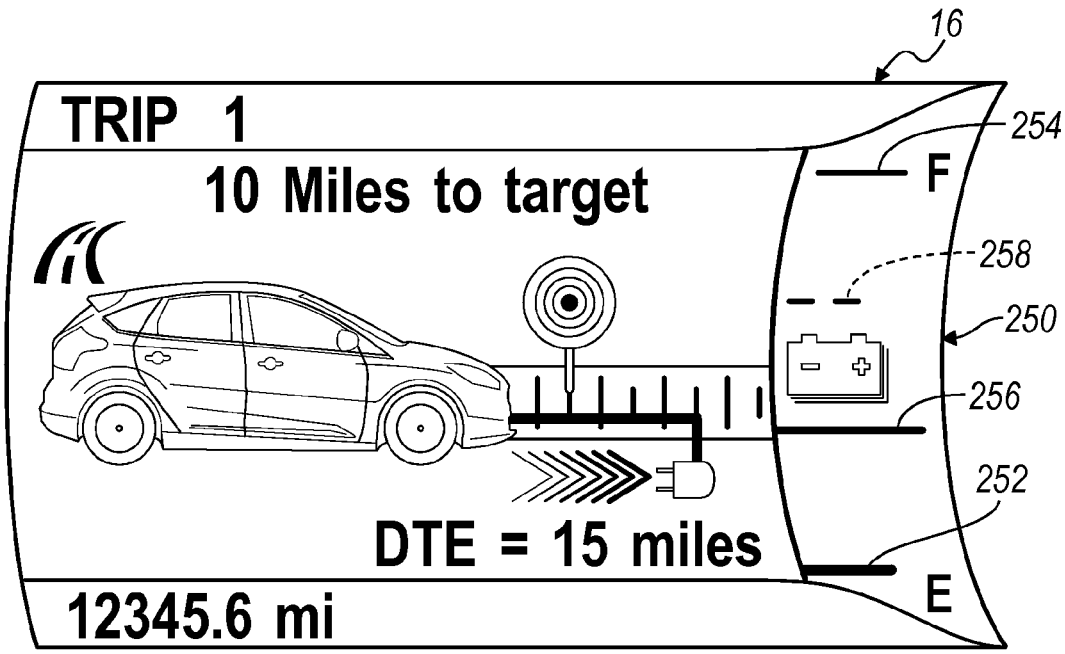
FIG. 6 is another enlarged view of the user interface of FIG. 4, illustrating vehicle operating conditions.

FIGS. 5 and 6 depict enlarged views of the user interface 16. With reference to FIG. 5, the driver selects a charging level using the user interface 16, according to one or more embodiments. The user interface 16 may prompt the driver to select UL in response to certain vehicle conditions, (e.g., the PROX signal indicates that the charger 52 is electrically connected to the external power supply). In one or more embodiments, the driver selects from a plurality of discrete charging limits (UL) which are each represented by a UL value element 210. In another embodiment, the driver selects UL from a variable number of UL values by controlling a UL indicator 212 to slide along a CSOC line 214 between 100% CSOC and 0% CSOC. In the illustrated embodiment, the CSOC is conveyed pictorially as a battery element 216 having a housing and a fluid level that represents CSOC values. The discharge limit (0% CSOC) is represented by a base 218 of the battery element 216 and the letter "E" for "Empty". The standard charging limit (100% CSOC) is represented by a top 220 of the battery element 216 and the letter "F" for "Full". The present energy level of the battery 32 is represented by a fluid level line 222, which is above the discharge limit 218. The present energy level 222 is approximately 15% BSOC which corresponds to a DTE of 9 miles, in the illustrated embodiment. Additionally, the charging limit (UL) as selected by the UL indicator 212 (65% CSOC) is shown as a horizontal line on the gage according to one or more embodiments and referenced by numeral 224.

With reference to FIG. 6, the user interface 16 conveys information, such as DTE and the present customer state of charge (CSOC) during normal operating conditions. In the illustrated embodiment, the CSOC is conveyed pictorially as a gage 250 having markings or horizontal lines that represent CSOC values. The discharge limit (0% CSOC) is represented by the letter "E" for "Empty" and by a horizontal line, referenced by numeral 252. The standard charging limit (100% CSOC) is represented by the letter "F" for "Full" and by a horizontal line referenced by numeral 254. The present energy level of the battery 32 is represented by a horizontal line 256, which is above the discharge limit 252. The present energy level 256 of the illustrated embodiment is approximately 22% BSOC, which corresponds to a DTE of 15 miles. Additionally, the charging limit (UL) from the last charging cycle is shown on the gage according to one or more embodiments and referenced by numeral 258. The selected charge level 258 provides a reference to the driver so that they can estimate the charge level for subsequent charging. For example, if the driver selected a UL of 80% CSOC, the battery 32 was charged to 80% CSOC and then only the driver discharged the battery to 60% CSOC on the following trip; then the driver may select a lower UL for the next charging cycle. In this way, a driver may associate a UL value with a frequently traveled trip (e.g., a commute to work).

Figure 7:
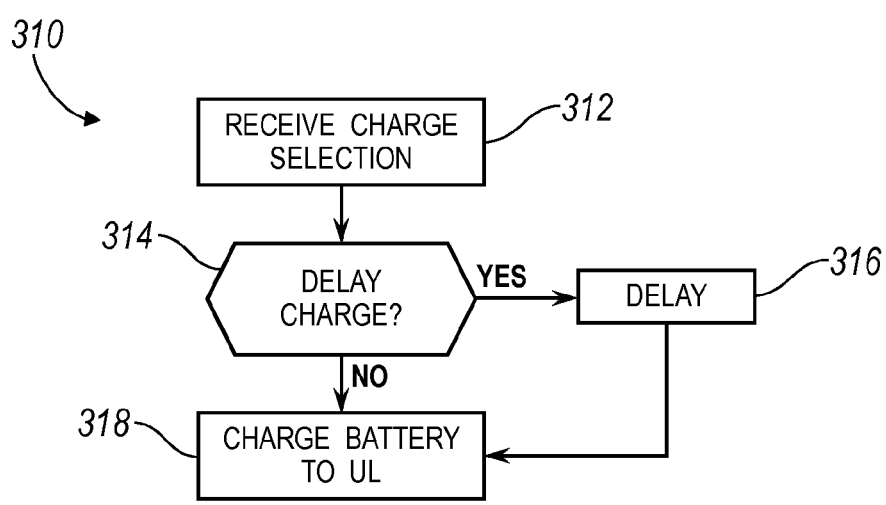
FIG. 7 is a flow chart illustrating a method for customized battery charging, according to one or more embodiments.

With reference to FIG. 7, a method for customized battery charging of the electric vehicle 12 of FIG. 1 is illustrated according to one or more embodiments and generally referenced by numeral 310. The method 310 is implemented using software code contained within the vehicle controller 14, according to one or more embodiments. In other embodiments, the method 310 is implemented in other vehicle controllers, or multiple vehicle controllers.

In operation 312, the vehicle controller 14 receives input that is indicative of a battery charge level selection. In one or more embodiments, the charge level selection corresponds to a variable charging limit (e.g., between 20% and 100% CSOC) that is selected by the driver using the user interface 16. In another embodiment, the charge level selection corresponds to a predetermined charging limit (e.g., 60% CSOC) that is selected by the driver using the key 54.

In operation 314 the vehicle controller 14 determines whether or not to delay charging. The cost associated with charging the battery 32 may depend on other factors, such as the time of day. For example, some providers of electrical energy reduce the cost of energy that is provided at off-peak hours of the day. In one or more embodiments, the vehicle controller 14 communicates with an external source, such as a smart meter of the external power supply (not shown) or a computer via a cellular network to determine when the cost of the electrical energy reduces. In one embodiment, the vehicle controller 14 also considers the time needed to charge the battery 32 based on the charging rate of the AC charger 52, the present CSOC of the battery 32 and the charge level selection. If the vehicle controller 14 determines that there is sufficient time and sufficient cost savings, then the vehicle controller 14 proceeds to operation 316 and delays charging. At operation 316 the vehicle controller 14 delays charging until the cost of the electrical energy supplied by the external power supply decreases below a predetermined threshold value (e.g., off-peak rates). If the determination at operation 314 is negative, then the vehicle controller 14 proceeds to operation 318 and begins charging the battery 32.

In operation 318 the vehicle controller 14 disables charging of the battery 32 when the CSOC reaches an upper charging limit (UL). The UL is based on the charge level selection. According to one or more embodiments, the vehicle controller 14 disables charging by instructing the AC charger 52 or the BECM 34 to disconnect from the external power supply (e.g., open a switch along a charging circuit).

The method 310 illustrated in FIG. 7 depicts a simplified method for customized battery charging where UL is equal to the charge level selection. For example, the driver selects a charge level of 60% CSOC and the vehicle controller 14 disables charging when the present CSOC value is equal to 60%.

Figure 8:
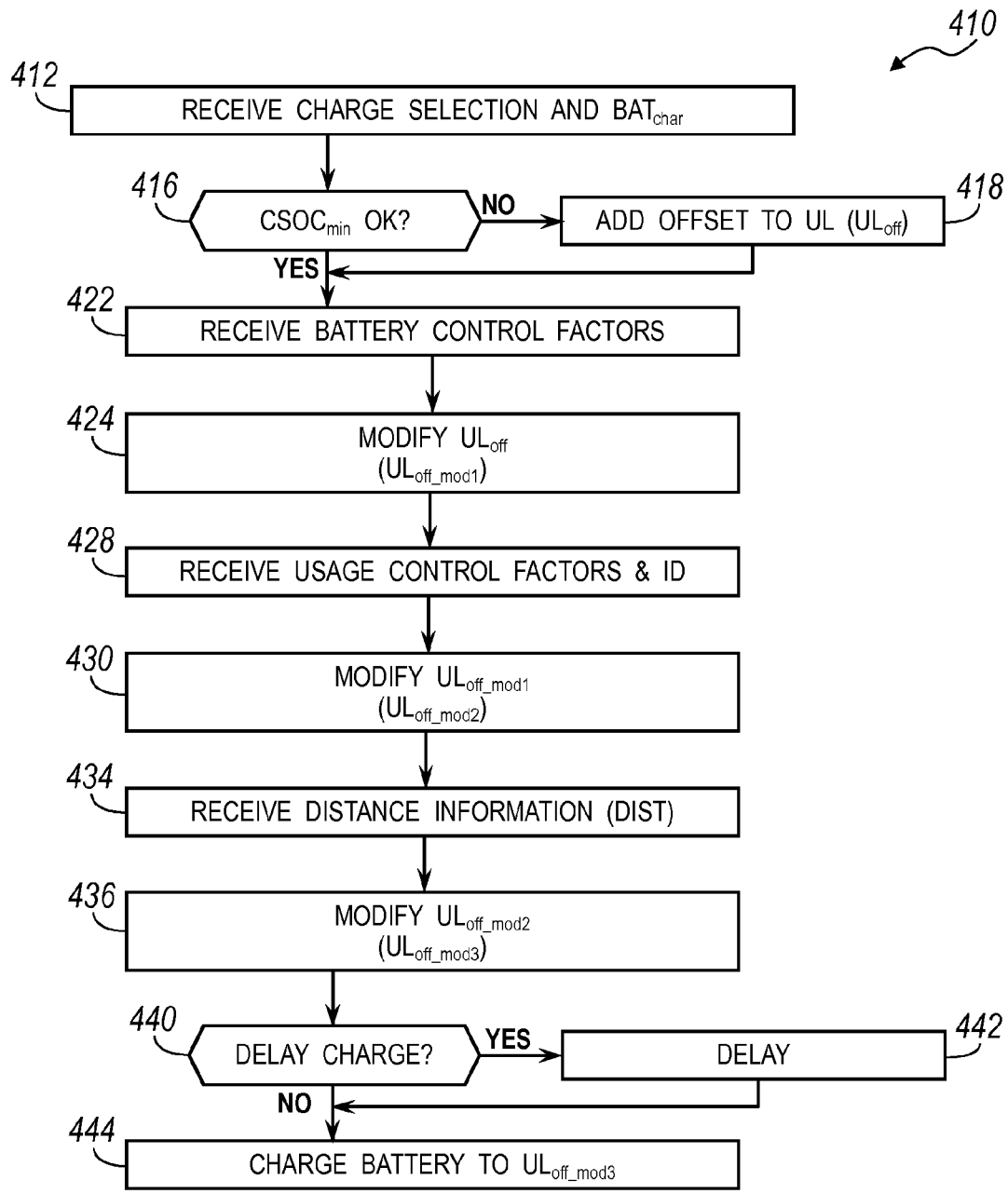
FIG. 8 is a flow chart illustrating another method for customized battery charging, according to one or more embodiments.
Figure 9:
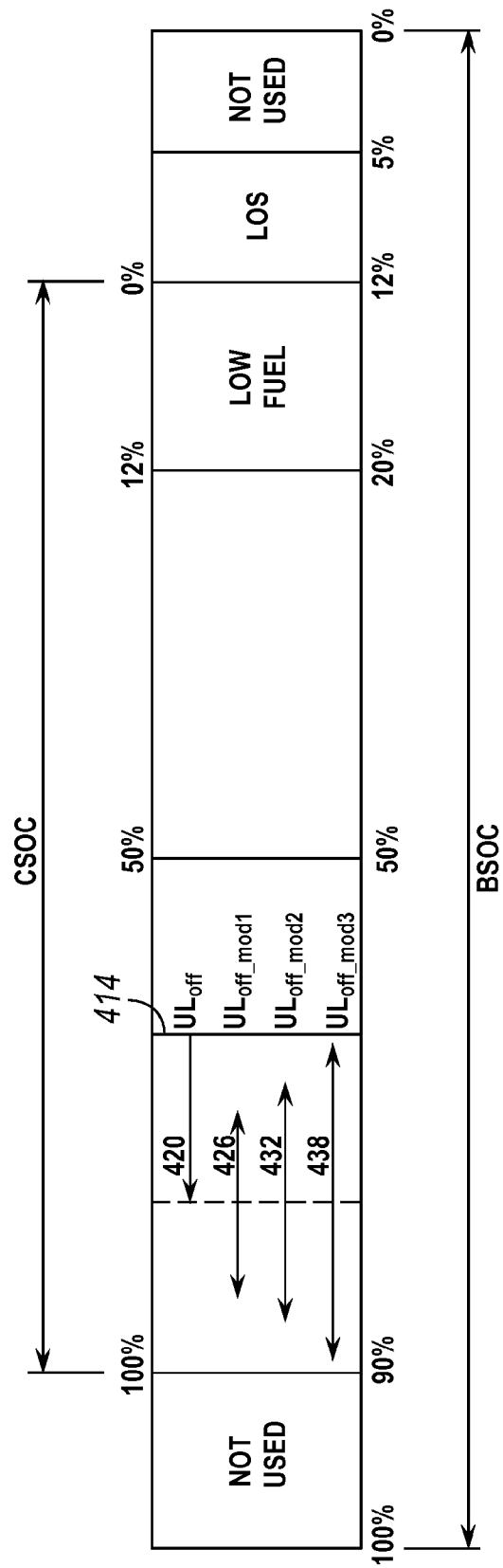
FIG. 9 is an enlarged view of the diagram of FIG. 3, illustrating a battery charge level selection due to the method of FIG. 8.

With reference to FIGS. 8 and 9, a method for customized battery charging of the electric vehicle 12 of FIG. 1 is illustrated according to one or more embodiments and is generally referenced by numeral 410. The method 410 is implemented using software code contained within the vehicle controller 14, according to one or more embodiments. The method 410 differs from the method 310 depicted in FIG. 7, in that the method 410 modifies the upper charging limit (UL) based on other vehicle conditions.

In operation 412, the vehicle controller 14 receives input that represents the charge level selection. In one embodiment, the charge level selection corresponds to a variable charging limit (e.g., between 20% and 100% CSOC) that is selected by the driver using the user interface 16. In another embodiment, the charge level selection corresponds to a predetermined charging limit (e.g., 60% CSOC) that is selected by the driver using the key 54. The charge level selection corresponds to an upper charging limit (UL), which is represented by line 414 in FIG. 9. The vehicle controller also receives input ($BAT_{char}$) that represents battery characteristics at operation 412 according to one or more embodiments.

In operation 416 the vehicle controller 14 determines if the minimum customer state of charge value ($CSOC_{min}$) is ok. The driver may select a charge level so that the battery 32 is discharged (low CSOC) when the driver returns to the charging station. However, battery aging may be affected if the battery 32 remains at a certain CSOC value for a prolonged period of time, or if the battery is repeatedly discharged to a certain CSOC value. These undesired CSOC values depend on the specific type of battery chemistry (e.g., lithium-ion). The vehicle controller 14 includes predetermined or calibrated data that identifies the undesired CSOC value for the battery 32. If the $CSOC_{min}$ corresponds to an undesired CSOC value, then the vehicle controller 14 determines that $CSOC_{min}$ is not ok at operation 416, and proceeds to operation 418.

At operation 418 the vehicle controller 14 offsets the charging limit. For example, in one embodiment, the vehicle controller 14 receives a charge level selection that corresponds to a UL of 60% CSOC. Then the vehicle controller 14 determines that 0% CSOC is an undesired CSOC value based on $BAT_{char}$. Then the vehicle controller 14 offsets UL (e.g., by adding 5% CSOC) to provide an offset upper charging limit ($UL_{off}$). By offsetting the UL, the $CSOC_{min}$ value also offsets so that the CSOC value when the driver returns to the charging station is offset from an undesired $CSOC_{min}$. $UL_{off}$ is generally referenced by numeral 420 in FIG. 9.

At operation 422, the vehicle controller 14 receives battery control factors such as measured battery values, calculated battery values and characteristic information. The measured battery values include: $T_{bat}$, $V_{bat}$, and $I_{bat}$, which represent battery temperature, battery voltage, and battery current measurement values, respectively. The calculated battery values include: $P_{cap}$, BSOC, CSOC, and AGE, which represent battery power capability, battery state of charge, customer state of charge and battery aging, respectively. The characteristic information includes: $CHG_{char}$, which represents charger characteristics.

At operation 424 the vehicle controller 14 modifies the offset charging limit ($UL_{off}$) based on one or more of the battery control factors. For example, in one embodiment, the vehicle controller 14 receives a charge level selection that corresponds to a UL of 90% CSOC, which is offset to 95% CSOC at operation 418. The vehicle controller 14 also receives a battery temperature ($T_{bat}$) of 50° C. The vehicle controller 14 determines that 95% CSOC is an undesired CSOC value at high battery temperatures. The vehicle controller 14 then modifies $UL_{off}$ to provide a modified upper charging limit ($UL_{off\_mod1}$) of 90% CSOC. $UL_{off\_mod1}$ is generally referenced by numeral 426 in FIG. 9.

At operation 428, the vehicle controller 14 receives battery usage control factors that relate to the historic power consumption of the motor 18, the climate control system 40 and the accessories 48. The vehicle controller 14 also receives an identity signal (ID) that represents the identity of the present driver of the vehicle 12. The vehicle controller 14 receives actual power consumption values ($P_{heat\_act}$, $P_{cool\_act}$, $P_{drv\_act}$, $P_{acc\_act}$) during operation of the vehicle 12 that correspond to the actual power consumed by the PTC heater 42, the HVAC compressor 44, the motor 18 and the LV battery 46. The vehicle controller 14 saves this power consumption data in its memory along with other data corresponding to certain vehicle conditions and the identity of the driver, when such power is consumed. By saving such data, the vehicle controller 14 develops historic data that it can later reference to estimate future power consumption.

At operation 430 the vehicle controller 14 further modifies the modified charging limit ($UL_{off\_mod1}$) based on one or more of the usage control factors. For example, in one embodiment, the vehicle controller 14 receives a charge level selection that corresponds to 40% CSOC, which is offset to 45% CSOC at operation 418. The vehicle controller 14 also receives an ambient temperature ($T_{amb}$) value of 30° C. (86° F.). The vehicle controller 14 analyzes the historic climate control system power consumption data for the present driver (ID) at high ambient temperatures, and determines that the present driver uses approximately 500 Watt hours (Wh) of energy to cool the vehicle (based on historic $P_{cool\_act}$) at such temperatures. The vehicle controller 14 then modifies $UL_{off\_mod1}$ to provide a further modified upper charging limit ($UL_{off\_mod2}$) of 50% CSOC. $UL_{off\_mod2}$ is generally referenced by numeral 432 in FIG. 9.

In another embodiment, the vehicle controller 14 receives a charge level selection that corresponds to 40% CSOC, which is offset to 45% CSOC at operation 418. The vehicle controller 14 also receives a driver identity (ID) signal corresponding to driver A. The vehicle controller 14 analyzes the historic motor power consumption data for driver A, and determines that driver A is an aggressive driver and uses approximately 1,500 Wh of additional energy (based on historic $P_{drv\_act}$) as compared to an average driver. The vehicle controller 14 then modifies $UL_{off\_mod1}$ to provide a further modified upper charging limit ($UL_{off\_mod2}$) of 60% CSOC at operation 430.

At operation 434 the vehicle controller 14 receives distance information (DIST) that relates to a travel distance between the present location of the vehicle and a target location of the vehicle. In one embodiment, DIST corresponds to a distance that is calculated by the navigation system 60 based on GPS data. In another embodiment, DIST corresponds to "short trip" estimate made by the driver by depressing the corresponding button 56 of the key 54.

At operation 436 the vehicle controller 14 further modifies the further modified charging limit ($UL_{off\_mod2}$) based on DIST. For example, in one embodiment the vehicle controller 14 receives a charge level selection that corresponds to 30% CSOC, which is offset to 35% CSOC at operation 418 and later modified to 25% CSOC at operation 430. The vehicle controller 14 receives distance information (DIST) that indicates that the driver has a trip of approximately 30 miles planned for their next trip. The vehicle controller 14 analyzes the historic motor power consumption data, and determines that approximately 6 kWh of additional energy (based on historic $P_{drv\_act}$) is needed for such a distance. The vehicle controller 14 then modifies $UL_{off\_mod2}$ to provide an even further modified upper charging limit ($UL_{off\_mod3}$) of 85% CSOC.

In operation 440 the vehicle controller 14 determines whether or not to delay charging. The vehicle controller 14 communicates with an external source to determine when the cost of the supplied electrical energy reduces. In one embodiment, the vehicle controller 14 also considers the time needed to charge the battery 32 based on the charging rate of the AC charger 52, the present CSOC of the battery 32 and the charge level selection. If the vehicle controller 14 determines that there is sufficient time and sufficient cost savings, then the vehicle controller 14 proceeds to operation 442 and delays charging. At operation 442 the vehicle controller 14 delays charging until the cost of the electrical energy supplied by the external power supply decreases below a predetermined threshold value (e.g., off-peak rates). If the determination at operation 440 is negative, then the vehicle controller 14 proceeds to operation 444 and begins charging the battery 32.

In operation 442 the vehicle controller 14 disables charging of the battery 32 when the CSOC reaches the modified upper charging limit ($UL_{off\_mod3}$). The $UL_{off\_mod3}$ is based on the charge level selection, and modified by battery, usage and navigation factors. Other embodiments of the method 410 contemplate fewer modifications to the charging limit, and modifications in different sequences.

As such, the vehicle system 10 provides advantages by allowing the driver to customize battery charging by selecting a charge level based on their future travel plans, which may be less than a standard maximum charging limit. The vehicle system 10 is also configured to modify the selected charge level based on present and historic vehicle conditions. Such customization of the charging limit extends battery life by avoiding excess cycling of the battery, and charging to undesired charge levels.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
a motor configured to provide drive torque;
a storage device connected to the motor and configured to receive power from an external supply for facilitating charging;
a climate control system configured to heat and cool at least one of a passenger compartment and the storage device;
a user interface configured to provide a charge level selection; and
at least one controller configured to:
receive input indicative of a present charge value, an identity of a present driver from a key, an ambient temperature, and a climate control system power consumption,
disable charging when the present charge value corresponds to the charge level selection: and
modify the charge level selection based on historic climate control system power consumption associated with the present driver and the ambient temperature.

2. The vehicle of claim 1 wherein the controller is further configured to disable charging when the present charge value corresponds to a value that is between 80% and 120% of the charge level selection.

3. The vehicle of claim 1 wherein the user interface further comprises a portable device that is configured to wirelessly communicate with the controller, and wherein the user interface is further configured to provide a travel distance associated with a subsequent trip;
wherein the controller is further configured to modify the charge level selection based on the travel distance.

4. The vehicle of claim 1 wherein the user interface is further configured to display at least two charge level selection elements corresponding to an available range of charge level selection values.

5. The vehicle of claim 1 wherein the user interface is further configured to display a gage with a first indicator corresponding to the charge level selection and a second indicator corresponding to the present charge value.

6. The vehicle of claim 1 further comprising:
a charger configured to receive AC power from the external supply and to provide DC power to the storage device;
wherein the controller is further configured to:
receive input indicative of a charging cost associated with the external supply, and a charging rate associated with the charger, and
delay charging based on the charging cost and the charging rate.

7. The vehicle of claim 1 wherein the controller is further configured to:
receive input indicative of an identity of a present driver and motor power consumption; and
modify the charge level selection based on historic motor power consumption associated with the present driver.

8. The vehicle of claim 1 further comprising:
a navigation system configured to:
receive input indicative of a target location from the user interface,
receive input indicative of a present location, and travel information from an external network, and
provide output indicative of a travel distance between the present location and the target location based on the travel information;
wherein the controller is further configured to:
receive input indicative of motor power consumption, and
modify the charge level selection based on estimated motor power consumption associated with the travel distance.

9. A vehicle system comprising:
a battery configured to receive power from an external supply for charging thereof; and
at least one controller configured to:
receive input indicative of a customer state of charge (CSOC) selection,
a present CSOC value of the battery, an identity of a present driver from a key, an ambient temperature, and a climate control system power consumption,
disable charging when the present CSOC value corresponds to a charging limit, the charging limit being based on the CSOC selection, and
modify the charging limit based on historic climate control system power consumption associated with the present driver and the ambient temperature.

10. The vehicle system of claim 9 wherein the controller is further configured to:
receive input indicative of a charging cost associated with the external supply; and
delay charging until the charging cost decreases below a predetermined threshold value.

11. The vehicle system of claim 9 wherein the controller is further configured to:
receive input indicative of an identity of a present driver and motor power consumption; and
modify the charging limit based on historic motor power consumption associated with the present driver.

12. The vehicle system of claim 9 wherein the controller is further configured to:
receive input indicative of motor power consumption, and a travel distance between a present vehicle location and a target vehicle location; and
modify the charging limit based on estimated motor power consumption associated with the travel distance.

13. A method for controlling electric vehicle charging comprising:
enabling charging of a storage device; receiving input indicative of a charging limit, a present charge value, an identity of a present driver from a key, an ambient temperature, and a climate control system power consumption;
disabling charging when the present charge value corresponds to the charging limit; and
modifying the charging limit based on historic power consumption associated with the present driver and the ambient temperature.

14. The method of claim 13 further comprising:
receiving input indicative of a charging cost associated with an external power supply; and delaying charging until the charging cost decreases below a predetermined threshold value.

15. The method of claim 13 further comprising:
receiving input indicative of an identity of a present driver and motor power consumption; and modifying the charging limit based on historic motor power consumption associated with the present driver.

16. The method of claim 13 further comprising:
receiving input indicative of motor power consumption, and a travel distance between a present vehicle location and a target vehicle location; and
modifying the charging limit based on estimated motor power consumption associated with the travel distance.

17. The method of claim 13 further comprising:
displaying a gage with a first indicator corresponding to the charging limit and a second indicator corresponding to the present charge value.

* * * * *